Nov. 8, 1966  N. L. DE MEO ETAL  3,283,769
PNEUMATIC VALVES
Filed Nov. 6, 1963  2 Sheets-Sheet 1
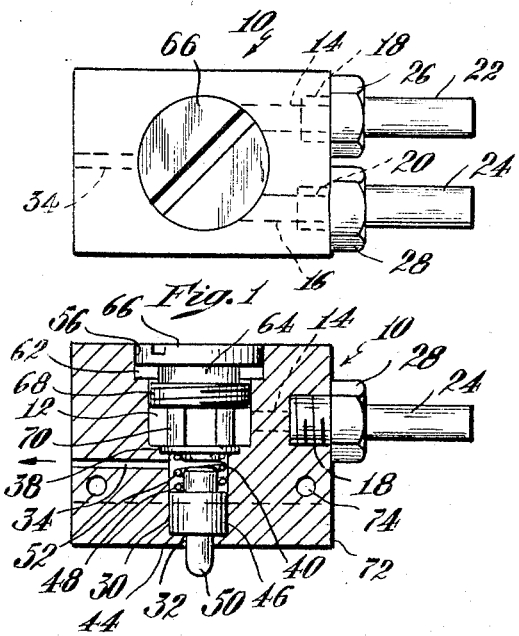
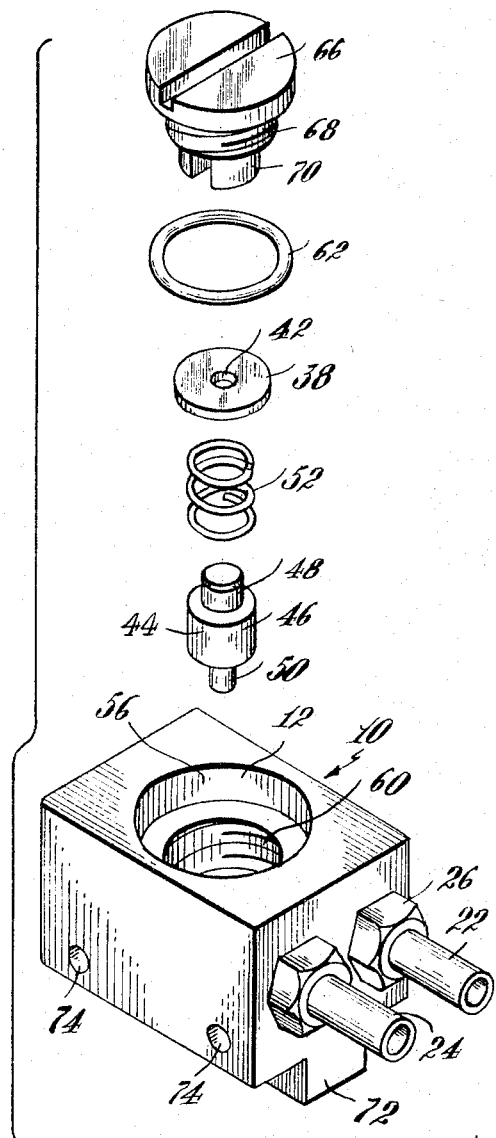
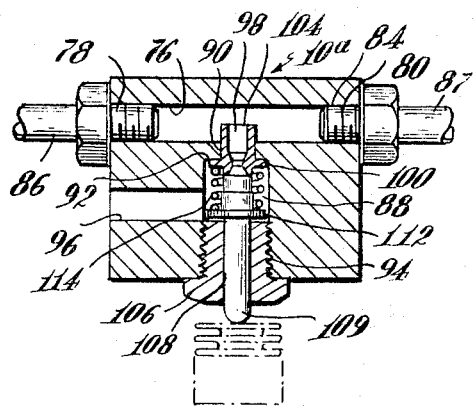
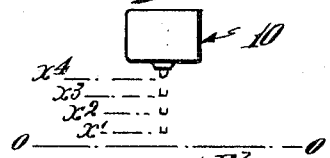
INVENTORS
Nicholas L. DeMeo
John A. Denner
By Roberts, Cushman & Grover
ATT'YS

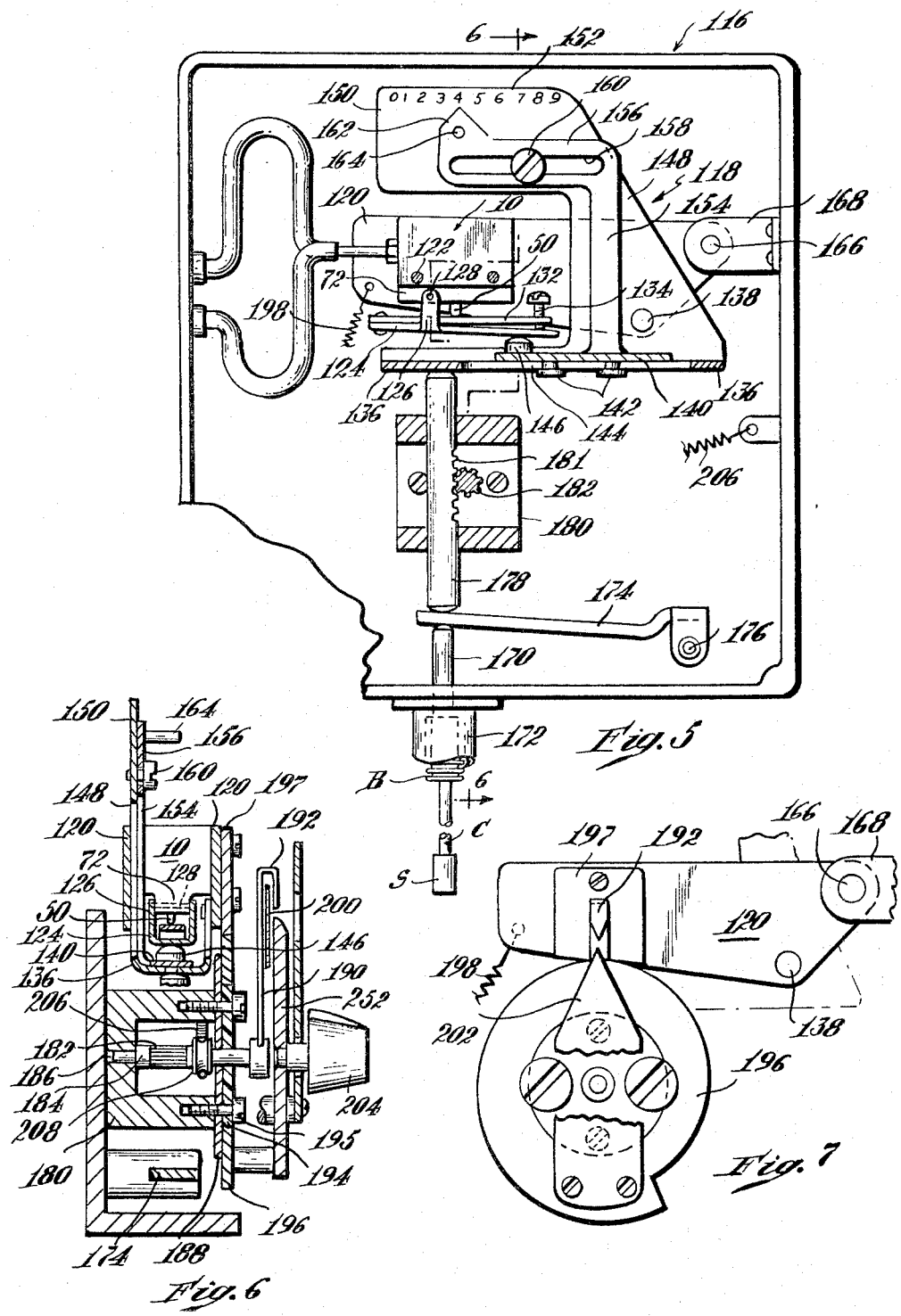

3,283,769
PNEUMATIC VALVES
Nicholas L. De Meo, Medford, and John A. Denner, West Roxbury, Mass., assignors to United Electric Controls Company, Watertown, Mass., a corporation of Massachusetts
Filed Nov. 6, 1963, Ser. No. 321,831
1 Claim. (Cl. 137—82)

This invention relates to valves and especially to control valves for fluids.

The principal objects of the invention are to provide a very simple, relatively small valve embodying a minimum number of moving parts for controlling flow of fluid either to increase or decrease the pressure in direct proportion or in some ratio to a change in temperature or pressure; and to provide a mounting therefor by means of which its operation can be variably proportioned for temperature and/or pressure changes for use with a remote-control instrument.

As herein illustrated, the valve comprises a valve body containing a chamber having inlet and outlet ports through which a fluid can enter and leave the chamber, a relief port in communication with the chamber through which fluid passing through the chamber may escape, and means operative to change the effective size of the relief port. The relief port is constituted by a passage containing an orifice, a valve element cooperable with the orifice, by movement relative thereto, to change its effective size, and means normally holding the valve element in an open position away from the orifice. The valve element has a part protruding from the valve body which constitutes a valve-actuating element. The body is mounted on a support, there is a first lever pivotally mounted on the support with a part engaged with the valve-actuating element, a second lever pivotally mounted on the support on an axis spaced from and parallel to the first axis, with its distal end underlying the distal end of the first lever, and means situated between the levers shiftable to vary the position of contact of the levers. The second lever is movable in response to a sensing element having engagement therewith and hence through the first lever to actuate the valve-actuating element. The first lever comprises a rigid arm, a yieldable part fixed at one end to the proximal end of the rigid arm and extending lengthwise of the first arm beneath the valve-actuating element, and a screw threaded through the distal end into engagement with the rigid arm. The means situated between the levers is a part slidable along the second arm having engagement with the rigid arm. An index element is fixed to the slidable part and is movable relative to its scale, the latter being fixed to the second arm to indicate the position of the part relative to the axes of the arms.

The invention will now be described in greater detail with reference to the accompanying drawings wherein:

FIG. 1 is a plan view of the valve;

FIG. 2 is a vertical section of the valve;

FIG. 3 is an exploded view of the parts of the valve in perspective;

FIG. 4 is a vertical section though an alternative form of the valve;

FIG. 5 is an elevation of the valve and valve-supporting means for supporting it in a recording instrument with the graduated dial, index and pointer omitted;

FIG. 6 is a vertical section taken on the line 6—6 of FIG. 5, showing the graduated dial, index and pointer;

FIG. 7 is a fragmentary front elevation of FIG. 6;

FIG. 8 is a fragmentary front elevation of the instrument showing the graduated dial; and FIG. 9 is a diagram illustrating the mode of laying out the switch-operating cam.

Referring to the drawings, the valve comprises a substantially rectangular body 10 containing a hole 12 (FIG. 3) which extends through it from the top side to the bottom side, and which provides a substantially cylindrical chamber 12 (FIG. 2). A pair of spaced parallel passages 14 and 16 (FIG. 1) extend from the chamber 12 through one end of the body. The outer ends of the passages are enlarged and threaded at 18 and 20 to receive the threaded ends of a pair of nipple elements 22 and 24, the latter being secured in position by nuts 26 and 28.

The chamber 12 has a well 30 at its lower end, the bottom of which contains an opening 32 which extends through the bottom of the body and the side of which contains an opening 34 which extends through the side of the body. An annular shoulder 36 is formed at the bottom of the chamber 12 around the upper end of the well and a valve element 38 is seated on the shoulder. The valve element 38 has a boss 40 at its lower side and contains a circular orifice 42 of the small diameter which extends centrally through the boss. A valve rod 44 is situated in the well and has a part 46 corresponding in diameter thereto operative to guide it for movement therein. The valve rod has an upper end 48 which is situated opposite the orifice in the valve plate and the part 50, at its lower end, protruding through the opening 32. A spring 52 is mounted within the well with one end engaged with the part 48 and the other with the boss 40 which, in conjunction, hold the spring concentric with the axis of the valve rod. The spring holds the upper end of the valve rod spaced from the orifice.

The upper end of the chamber 12 is enlarged at 56 so as to provide an annular shoulder 58 and the wall of the chamber, adjacent the shoulder, is threaded at 60. A gasket 62 is placed on the shoulder and a threaded plug 64, having a head 66 which fits into the opening against the gasket, and a threaded portion 68, is screwed into the threaded portion in the chamber. A pair of spaced parallel legs 70—70 of semicircular cross-section extend downwardly from the cap into engagement with the upper side of the valve element 38 and hold the latter against its seat in opposition to the spring 52. The protruding end 50 of the valve rod provides means for moving the valve rod relative to the valve element so as to change the spacing of the inner end of the valve rod with reference to the orifice 42. By varying the position of the rod it is possible to increase or decrease the flow of fluid through the chamber from the inlet to the outlet ends by the simple expedient of bypassing more-or-less through the passage 34. Thus, the valve provides means for controlling a drop in pressure which is proportional to changes in some other variable condition, for example a pressure or temperature.

A modification of the valve is shown in FIG. 4, comprising a block 10a of substantially rectangular cross-section containing a straight passage 76, the opposite ends of which are threaded at 78 and 80 for reception of the threaded ends 82 and 84 of inlet and outlet pipes 86 and 87.

A well 88 is formed in the block at right angles to the passage 76 so that its inner end intersects the passage 76. The bottom of the well contains a small opening 90 thereby providing a shoulder 92 and the outer end of the well is threaded at 94. A passage 96 extends from the side of the well at right angles thereto through the block to the atmosphere. A nozzle 98 is disposed in the well, the nozzle having a flange 100 seated against the shoulder 92 and a hollow part 104 which extends through the opening 90 to approximately the axial center of the passage 76.

A gland 106 containing a hole 108 is screwed into the threaded hole 94 and a valve rod 109 is mounted in the gland with its inner end opposite the nozzle and its outer end protruding from the gland. The valve rod has on it a flange 112. A spring 114, disposed about the valve rod between the flange 100 on the nozzle and the flange 112, normally holds the end of the valve rod spaced from the orifice in the nozzle. By moving the protruding end of the valve rod inwardly, for example, by means of an expandable element such as a bellows, expansion of which is effected by a volatile fluid, the distance between the valve rod and the orifice may be varied to permit a greater or lesser amount of the fluid flowing through the passage 76 to be bypassed through the passage 96.

The valve in each of its forms, as described above, may be used to control the flow of air or a liquid either directly or indirectly in proportion to an increase or decrease of some condition such as temperature or pressure. One application of the device is shown in FIGS. 5 to 9, for use in a recording instrument 116, the box containing the recorder being shown as of generally rectangular shape and the device being mounted therein on a support 118. The support comprises spaced parallel plates 120—120 between which the valve block 10 is secured by bolts 122 which pass through the holes 74 in the valve body. A first lever 124, having upwardly extending, spaced parallel limbs 126—126, is pivotally supported on a downwardly projecting rib 72 at the bottom of the valve body by a pin 128. The lever is a rigid arm and has secured to one end a yieldable part 132 which underlies the valve rod 50. A screw 134 is threaded through the distal end of the part 132 against the rigid arm and is adjustable to change the spacing between the arm and the part 132. A second lever 136 ise pivotally mounted at 138 between the supports 120—120 so that it underlies the first lever. A plate 140, having headed pins 142—142 on its lower side extending through a slot 144 lengthwise of the lever, is slidable thereon and has on it a nub 146 engaged with the underside of the rigid arm 124 of the first lever. The nub 146 may be shifted lengthwise of the second layer to change its point of engagement with the first lever. The second lever has an upwardly projecting part 148 and a horizontally projecting, vertically disposed part 150, along the upper edge of which is a scale 152. The plate 140 has on it an upright 154, at the upper extremity of which is a horizontal arm 156. The arm 156 contains a slot 158 through which a screw 160 is screwed into the part 150. The arm 156 has an index 162 adapted to be moved along the scale and a pin 164 connected thereto by means of which the index may be moved along the scale to reposition the nub 146 relative to the first lever.

The opposite ends of the plate 120—120 are provided with means for pivotal support on a pin 166, the latter being secured at its ends between a pair of spaced parallel bracket members 168—168 bolted to the wall of the instrument.

A pin 170 extends into the casing from a hollow tube 172 against the underside of an arm 174 pivotally mounted at 176 on the back of the casing. A spindle 178 is mounted in a bracket 180 with its lower end resting on the arm 174 and its upper end beneath the lever 136. An expansible motor, such as a bellows B, which is responsive to an increase in pressure through the aforesaid components, to wit, the pin 170, arm 174 and spindle 178, is operative to actuate the lever 136. A sensing device S, in the form of a bulb filled with a volatile fluid and connected to the bellows by a capillary tube C, expands the bellows in response to an increase in temperature. Equivalent means may, of course, be employed in the form of a pressure-responsive device operable, by an increase in pressure, to actuate the pin 170.

As herein disclosed, by moving the nub 146 toward the right, that is, toward the higher numbers on the scale, the distance between the nub 146 and the pivot point of the lever increases thereby requiring the pin 170 to move a greater distance in order to actuate the valve. This results in a wider temperature differential which, of course, could be decreased by moving the index along the scale toward the left which would move the nub 146 a corresponding amount.

In the instrument, as shown herein, the temperature or pressure at which the pin 170 will become effective to actuate the lever 136 is adjustable. To this end, the spindle 178 has on it a rack 181 which meshes with a gear 182. The gear 182 is formed on or integral with a shaft 184 journaled in the bracket 180 (FIG. 6), with its rear end set into a hole 186 and its forward end extending through a plate 188. The forward end of the shaft has on it an arm 190, at the distal end of which is a hook terminating in a pointer 192. A circular plate 194 is fastened to the bracket against the plate 188 by screws 195 and provides a bearing for receiving a cam ring 196, an edge of which bears against the underside of a block of insulation 197 fastened to one of the arms 120, the right-hand arm as seen in FIG. 6. A spring 198, secured at one end to one of the arms 120, and at its other end to the casing, yieldingly pulls the support downwardly so as to hold the block 197 against the cam ring 196 at all times. By rotating the cam ring the distance between the upper end of the spindle 178 and the lever 136 can be adjusted for whatever temperature or pressure of operation is desired.

A scale plate 200 (FIGS. 6 and 7) is secured transversely of the casing perpendicular to the axis of the shaft 184 in a position such that the pointer 192 extends downwardly parallel to its front side and is movable arcuately along the scale of indicia thereon. A pointer 202 is mounted on the cam ring so as to be rotatable therewith relative to the pointer 192 and a knob 204 is secured to the pointer to enable turning it and the cam ring. One end of a spring 206 is coiled about a pulley 208 on the shaft 184 and the other end is secured to the back of the casing. The spring tends to swing the pointer 192 in a counterclockwise direction.

Operation of the instrument takes place as follows: Assuming that the valve 10 is to be actuated when the temperature is that indicated, for example, by the graduation $T^1$, the temperature at the start being less than that indicated by the graduation $T^1$, the knob 204 will be turned until the pointer 202 is located at the graduation $T^1$. As the temperature to which the bulb B of the motor is exposed gradually rises, the bellows will expand correspondingly, thus moving the pin 170 upwardly and thus swinging the arm 174 about the axis of its pivot 176. This will move the spindle 178 upwardly and by means of the rack 180 and pinion 184 will turn the shaft 186 and hence swing the pointer 192 in a clockwise direction along the graduated scale toward the graduation $T^1$.

Assuming that turning of the cam ring 196 in setting the pointer 192 opposite the graduation $T^1$ raised the valve 10 so that the lower side of the actuating lever 136 was initially spaced from the upper end of the spindle 178, the valve will remain in its normal condition (whatever that may be, whether closed or open) until, in the continued rise of the spindle 178, the upper end of the latter engages the lever 136 and moves the latter upwardly. Following engagement of the upper end of the spindle with the actuating lever actuation of the valve is dependent upon the setting of the nub 146 lengthwise of the lever 136.

The contour of the peripheral surface of the cam ring 196 is such that the valve will be actuated substantially at the instant at which the temperature at the bulb is that indicated by the pointer 192. It is apparent that through the levers 132 and 134, as previously described, various proportions of the opening of the valve in response to actuation once the spindle engages the lever 136 may be obtained.

The contour of the cam whereby this substantially instantaneous movement of the lever is effected in response to attainment of the temperature indicated by the pointer on the scale is obtained substantially in accordance with the formula $R^2-R^1:R^3-R^2=X^2:X^1:X^3-X^2$, where $R^1$, $R^2$, $R^3$ and $R^4$ are any successive radii of the cam, angularly spaced corresponding to successive graduations of the scale, and $X^1$, $X^2$, $X^3$ and $X^4$ are the distances between a fixed datum line such as O—O and successive positions of the valve-actuating rod (resulting from successive rotational positions of the cam), $Ro$ corresponding to the position of the pointer 192 at the lowest graduation of the scale and $Rn$ corresponding to the highest graduation of the scale. The above quantities are indicated diagrammatically in FIG. 9, it being understood of course that the pinion 182 will be so designed as to produce the desired motion of the pointer corresponding to the setting of the valve as determined by the cam.

It should be understood that the present disclosure is for the purpose of illustration only and that this invention includes all modifications and equivalents which fall within the scope of the appended claim.

We claim:

A valve comprising a valve body containing a hole through it having portions of different diameter, a first hole of predetermined diameter, a second hole of smaller diameter separated from the first hole by a first annular shoulder, a third hole of still smaller diameter separated from the second hole by a second shoulder, and a fourth hole of still smaller diameter separated from the third hole by a third shoulder, said second hole containing inlet and outlet ports, an escape passage in communication with the third hole, an orifice plate mounted on the second shoulder, a closure cap threaded into the first hole against a gasket mounted on the first shoulder, a stem on the cap extending into the second hole into engagement with the orifice plate and holding the latter against the second shoulder, a rod disposed in the third and fourth holes with one end adjacent the orifice plate and the other end projecting from the fourth hole, said rod having a bearing part slidably engaged within the third hole, and a spring mounted in the third hole, about the rod, with its ends engaged, respectively, with the orifice plate and the bearing part on the rod.

References Cited by the Examiner
UNITED STATES PATENTS

| | | | |
|---|---|---|---|
| 2,981,514 | 4/1961 | Loxham | 251—322 X |
| 3,147,767 | 9/1964 | Goss | 137—608 |
| 3,166,085 | 1/1965 | Holloway | 147—82 |
| 3,174,498 | 3/1965 | Joseting | 137—82 |

FOREIGN PATENTS 562,645   7/1944   Great Britain.

WILLIAM F. O'DEA, *Primary Examiner.*

ALAN COHAN, *Examiner.*